(12) United States Patent
Diwaker et al.

(10) Patent No.: US 12,225,264 B2
(45) Date of Patent: Feb. 11, 2025

(54) SECONDARY CONTENT TRANSCODE PIPELINE

(71) Applicant: NBCUniversal Media, LLC, New York, NY (US)

(72) Inventors: Naman Diwaker, Weehawken, NJ (US); Alfred Gutierrez, Torrance, CA (US); Dipan Majumder, Seacaucus, NJ (US); David Bohunek, New York, NY (US); Christopher Lynn, Westfield, NJ (US); Constantinos Hoppas, Mt. Kisco, NY (US)

(73) Assignee: NBCUniversal Media, LLC, New York, NY (US)

( * ) Notice: Subject to any disclaimer, the term of this patent is extended or adjusted under 35 U.S.C. 154(b) by 123 days.

(21) Appl. No.: 18/202,481

(22) Filed: May 26, 2023

(65) Prior Publication Data

US 2024/0397142 A1 Nov. 28, 2024

(51) Int. Cl.
*H04N 21/4402* (2011.01)
*H04N 21/262* (2011.01)
*H04N 21/8352* (2011.01)

(52) U.S. Cl.
CPC ....... *H04N 21/440218* (2013.01); *H04N 21/26241* (2013.01); *H04N 21/8352* (2013.01)

(58) Field of Classification Search
CPC ..... H04N 21/440218; H04N 21/26241; H04N 21/8352
See application file for complete search history.

(56) References Cited

U.S. PATENT DOCUMENTS

| 2007/0204064 | A1* | 8/2007 | Mail |
| 2013/0091521 | A1* | 4/2013 | Phillips ............ H04N 21/2668 |
| 2019/0141394 | A1* | 5/2019 | Loheide ............ H04N 21/458 |

* cited by examiner

*Primary Examiner* — Anthony Bantamoi
(74) *Attorney, Agent, or Firm* — Fletcher Yoder, P.C.

(57) ABSTRACT

The present disclosure relates generally to techniques for dynamic secondary content insertion into streaming content. More specifically, the present disclosure relates to methods and systems for efficient transcoding and insertion of transcoded secondary content (e.g., advertisements or "ads") into streamed primary content. Transcoded versions of content are associated and stored with a mezzanine version content identifier. Secondary content selection/insertion indications may use this identifier to select a secondary content independent of a particular transcoded version.

20 Claims, 6 Drawing Sheets

JOB

| | |
|---|---|
| ID | 63f818d98d64b25c8b548cba — 502 |
| SOURCE | http://sc.provide.com /tvn /N03OBGCR303503H_ENT_MEZZ /N03OBGCR303503H_ENT_MEZZ.mp4 — 506 |
| CREATIVE ID | 0b8d9334-2550-482b-84ac-57723e2dc6a5 — 504 |
| CREATED DATE | 2023-02-24T01:54:33.277 |
| BACKFILL DATE | ⎱ 507 |
| STATUS | REGISTERED |

TASKS — 508

| ID — 510 | TEMPLATE — 512 | SUBMIT TIME — 514 | VERSION — 516 | STATUS — 518 | REGISTERED — 520 | DETAILS — 522 |
|---|---|---|---|---|---|---|
| 63f818d98d64b25c8b548cbb | 4k_HDR_4s | 8 DAYS AGO | V1 | COMPLETE | 2/2 | SHOW DETAILS |
| 63f818d98d64b25c8b548cbc | 4k_SDR_4s | 8 DAYS AGO | V1 | COMPLETE | 2/2 | SHOW DETAILS |
| 63f818d98d64b25c8b548cbd | 20221006_cmaf_dash_his... | 8 DAYS AGO | V1 | COMPLETE | 2/2 | SHOW DETAILS |
| 63f818d98d64b25c8b548cbf | 20220824_cmaf_dash_his... | 8 DAYS AGO | V1 | COMPLETE | 2/2 | SHOW DETAILS |
| 63f818d98d64b25c8b548cc3 | 20220824_4k_HDR_cmaf... | 8 DAYS AGO | V1 | COMPLETE | 2/2 | SHOW DETAILS |
| 63f818d98d64b25c8b548cc1 | 20220824_4k_HDR_cmaf... | 8 DAYS AGO | V1 | COMPLETE | 2/2 | SHOW DETAILS |
| 63f818d98d64b25c8b548cc2 | 20220824_cmaf_dash_his... | 8 DAYS AGO | V1 | COMPLETE | 2/2 | SHOW DETAILS |

AUTO UPDATE

TASKS  STATUS: [REGISTERED]  ⊙ AUTO UPDATE

| ID | TEMPLATE | SUBMIT TIME | VERSION | STATUS | REGISTERED | DETAILS |
|---|---|---|---|---|---|---|
| 63f818dd8d64b25c8b548cbb | 4K_HDR_4s | 8 DAYS AGO | V1 | COMPLETE | 2/2 | [HIDE DETAILS] |

ENCODE ID: 1677203677359-s6hs36
START TIME: 2023-02-24T01:54:40Z
FINISH TIME: 2023-02-24T01:54:28Z
DURATION: 111 SECONDS
STATUS: [COMPLETE]

| FILENAME | PLAYBACK TYPE | REGISTERED | URL | REGIONS | | |
|---|---|---|---|---|---|---|
| s3://prod-us-east-2/atp/0b8d9334-2550-482b-84ac... | DASH | ⊘ | MPD △ | US-EAST-1 | US-WEST-2 | |
| s3://prod-us-east-2/atp/0b8d9334-2550-482b-84af... | HLS | ⊘ | M3U8 △ | US-EAST-1 | US-WEST-2 | |

PREVIEW:
[HIDE PREVIEW]

[612]   [614]

| 63f818dd8d64b25c8b548cbc | 4k_HDR_4s | 8 DAYS AGO | V1 | COMPLETE | 2/2 | [HIDE DETAILS] |

ENCODE ID: 1677203677355-v3q04r
START TIME: 2023-02-24T01:54:38Z

702 {
```
<bitrate="25268" delivery="progressive" height="1080" id=56999527.0_1" type="video/mp4" width="1920" >
<![CDATA[ https://ps.tans-m.com/assets/161199/810814/source_161199_810814.mp4 ]]>
<bitrate="400" delivery="progressive" height="360" id=56999527.0_1" type="video/mp4" width="640" > 706
<![CDATA[ https://ps.tans-m.com/media/encoded/01_23/603832/10_source_161199_810814.mp4 ]]>
<bitrate="2000" delivery="progressive" height="720" id=56999527.0_4" type="video/mp4" width="1920" >
<![CDATA[ https://ps.tans-m.com/media/encoded/01_23/603832/11_source_161199_810814.mp4 ]]>
<bitrate="4000" delivery="progressive" height="1080" id=56999527.0_4" type="video/mp4" width="1920" > 706
<![CDATA[ https://ps.tans-m.com/media/encoded/01_23/603832/13_source_161199_810814.mp4 ]]>
<bitrate="20000" delivery="progressive" height="1080" id=56999527.0_5" type="video/mp4" width="1920" >
<![CDATA[ https://ps.tans-m.com/media/encoded/01_23/603832/19_source_161199_810814.mp4 ]]>
<bitrate="700" delivery="progressive" height="480" id=56999527.0_6" type="video/mp4" width="854" >
<![CDATA[ https://ps.tans-m.com/media/encoded/01_23/603832/36_source_161199_810814.mp4 ]]>
<bitrate="1500" delivery="progressive" height="540" id=56999527.0_7" type="video/mp4" width="960" >
<![CDATA[ https://ps.tans-m.com/media/encoded/01_23/603832/38_source_161199_810814.mp4 ]]>
<bitrate="2500" delivery="progressive" height="480" id=56999527.0_8" type="video/mp4" width="854" > 706
<![CDATA[ https://ps.tans-m.com/media/encoded/01_23/603832/43_source_161199_810814.mp4 ]]>
<bitrate="5000" delivery="progressive" height="360" id=56999527.0_9" type="video/mp4" width="640" >
<![CDATA[ https://ps.tans-m.com/media/encoded/01_23/603832/63_source_161199_810814.mp4 ]]>
```
}

704 {
```
<delivery="streaming" height="0" id=337258366" type="application/octet-stream" width="0" >  504
<![CDATA[ 0b8d9334-2550-482b-84ac-57723e2dc6a5 ]]>
```
}

FIG. 7

SECONDARY CONTENT TRANSCODE PIPELINE

BACKGROUND

The present disclosure relates generally to techniques for dynamic secondary content insertion into streaming content. More specifically, the present disclosure relates to methods and systems for efficient transcoding and insertion of transcoded secondary content (e.g., advertisements or "ads") into streamed primary content. In the current disclosure, to facilitate the discussion by providing a specific example, secondary content is sometimes referred to as an "ad" or "advertisement" and secondary content servers/services are sometimes referred to as "ad" or "advertisement" servers/services. This term usage is not intended to limit the secondary content to traditional advertisements or secondary content servers and/or services to advertisement-based servers and/or services. Instead, the use of "ad" and/or "advertisement" in the current disclosure should be read as interchangeable with other types of secondary content, such as secondary interactive content, commentary, etc. to be presented in conjunction with primary content, such as streaming content requested by a consumer.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The number of content streaming platforms has increased drastically over the last several years. Each content streaming platform may specify their own content provisioning criteria, which may be selected, for example, based upon prioritized goals of a particular content streaming platform. Because each content streaming platform may have different prioritized goals, the content provisioning criteria may vary drastically from content streaming platform to content streaming platform. Varied content provisioning criteria may result in varied renditions of source content being necessary to satisfy each of the varied content providing criteria of the different content streaming platforms. Further, some content streaming platforms may use robust content rendition selection schemes that may use and/or provision numerous different renditions of source content in response to observing a variety of playback conditions (e.g., content player conditions, playback network conditions, etc.). For these robust rendition selection techniques, it may be desirable to maintain a large number of renditions, enabling the rendition selection techniques to more-granularly select an appropriate rendition that will result in a desired quality and/or performance tradeoff.

Traditional secondary content (e.g., advertising) insertion techniques have relied on advertising decisioning servers ("secondary content decisioning servers") to select and provide a particular rendition of secondary content, such as an advertisement. Unfortunately, however, advertising decisioning services ("ad services") are oftentimes third-party services that may require extensive lead time in creating the transcoded versions of the source content ("the creative") which may result in many inefficiencies. For example, the significant content registration time required by traditional approaches may result in longer lead time to advertisement availability, potentially resulting in reduced monetization.

Further, these traditional approaches provide less transparency, flexibility, and adaptability to process changes. As such, a need exists to offload transcoding and rendition selection responsibilities from the secondary content decisioning server/ad service to create new efficiencies in secondary content (e.g., ad) insertion and provisioning.

BRIEF DESCRIPTION

The content transcoding and provision methods disclosed herein enable more direct oversight and management by a content provider. Accordingly, less coordination may be required with the secondary content decisioning services (e.g., ad services) teams, resulting in increased flexibility in the transcoding process and in rendition selection flexibility. Additionally, content may be more efficiently managed, enabling content providers to maintain renditions while allowing the secondary content decisioning services teams to focus on secondary content (e.g., advertisement) selection.

To enable content providers to trigger generation of transcoded renditions and ultimately select a particular generated rendition for playback by a client player, a new secondary content transcode pipeline ("SCTP") is described herein. The SCTP is charged with creating a unique identifier for source content (e.g., mezzanine versions of advertisements) which will be used throughout the transcoding and advertisement delivery process. As will be described in detail below, the SCTP may trigger transcoding of source content into desired renditions of content that may be played back on a content streaming platform. The SCTP may provide the unique identifier of the source content to the secondary content (e.g., ad) decisioning service, for use as a reference to provide when selecting the source content for insertion into a particular playback of primary content.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings.

FIG. 5 is a schematic diagram, illustrating a graphical user interface (GUI) of the transcode pipeline, in accordance with certain embodiments;

FIG. 6 is a schematic diagram, illustrating expansion of rendition details of a particular managed rendition within the GUI of FIG. 5, in accordance with certain embodiments; and FIG. 7 is a schematic diagram illustrating a secondary content decisioning server response comparison when using secondary content decisioning server managed renditions versus downstream managed renditions.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
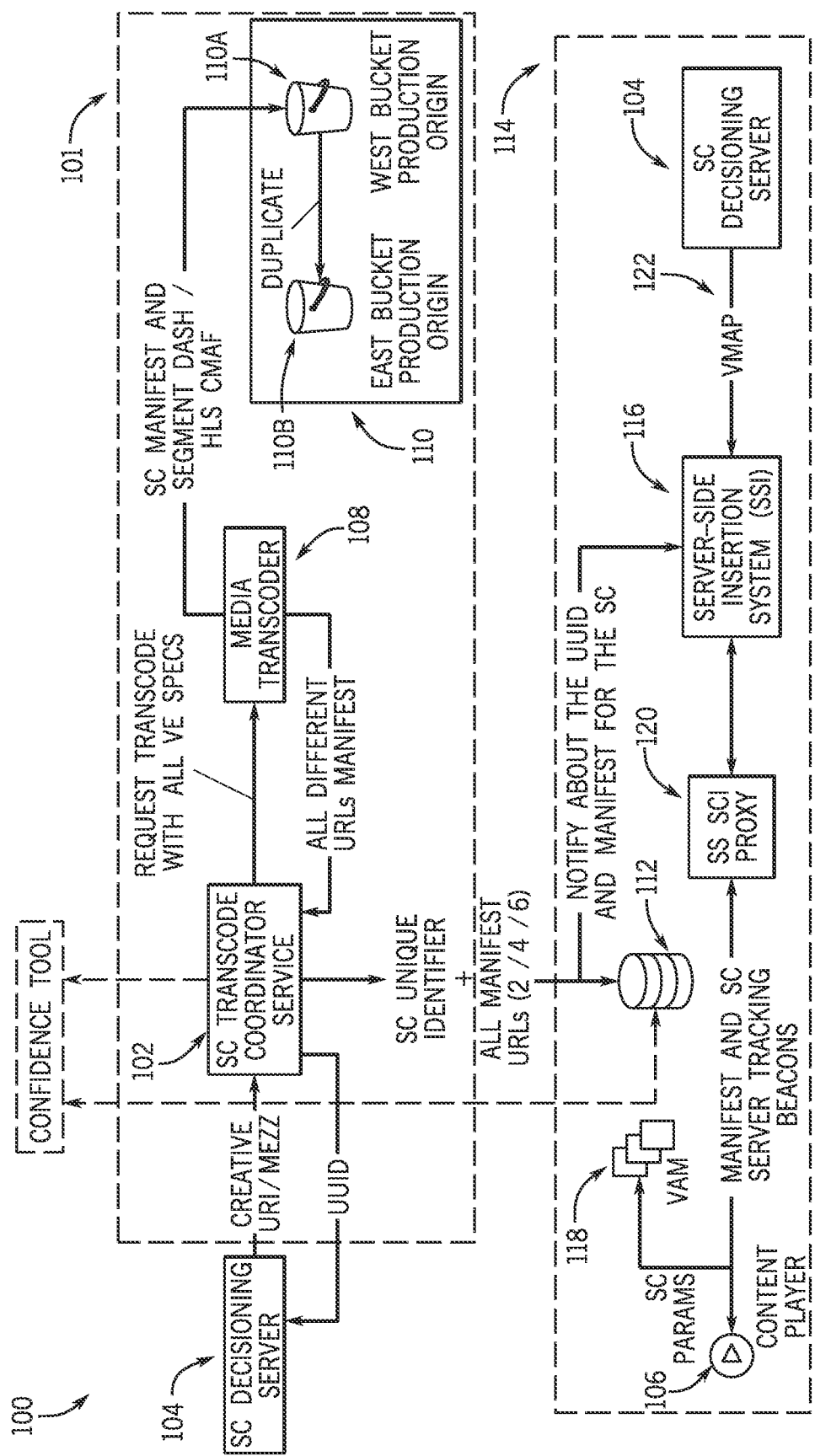
FIG. 1 is a schematic diagram, illustrating a system with a secondary content (e.g., ad) transcode pipeline that facilitates vendor agnostic transcoding downstream of a secondary content decisioning server and secondary content insertion, in accordance with certain embodiments.
Figure 2:
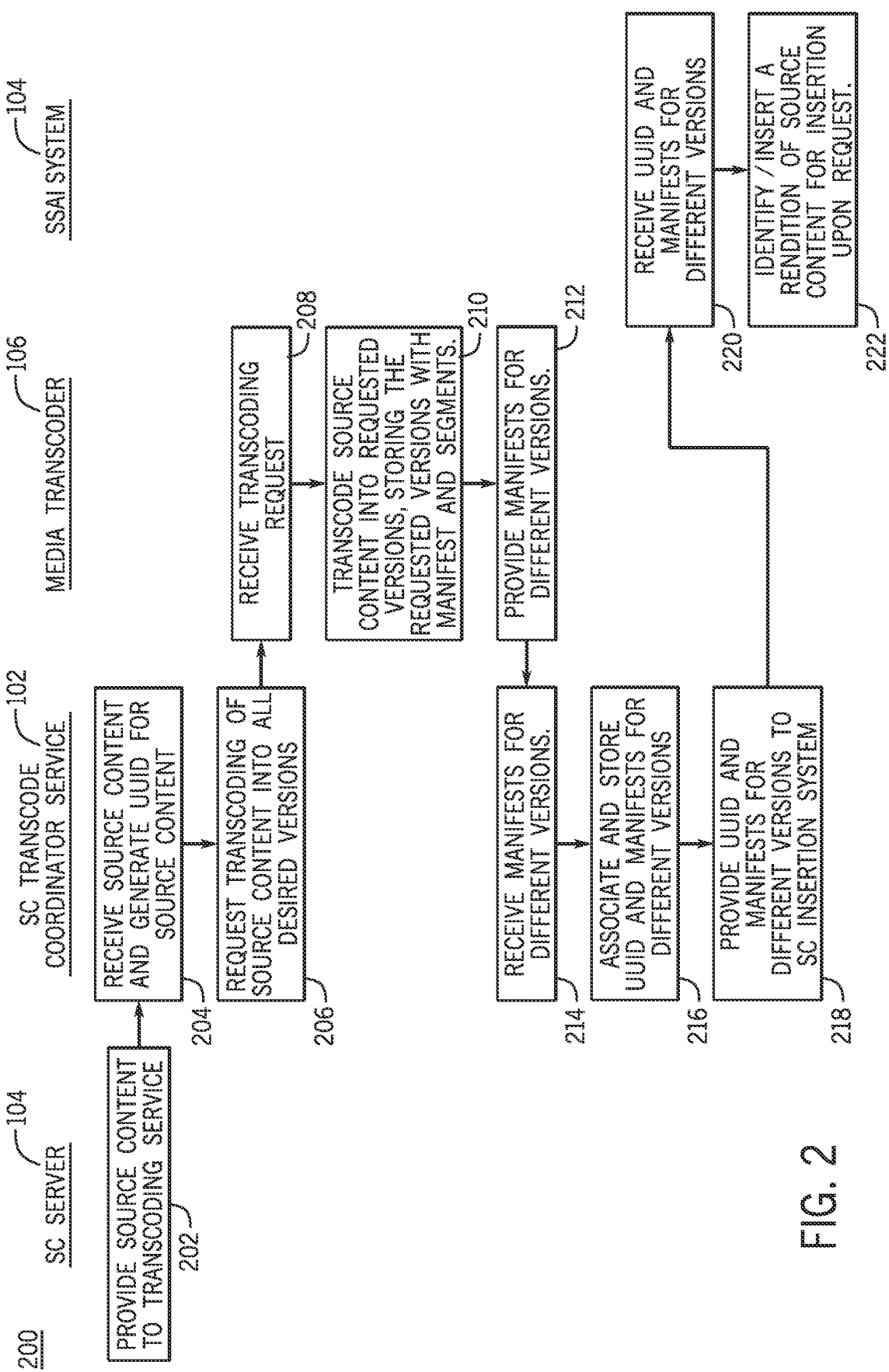
FIG. 2 is a swim lane diagram, illustrating processes employed by the system 100 of FIG. 1 for registering source content, generating transcoded renditions of the source content, and associating renditions with the source content, in accordance with certain embodiments.

FIG. 1 is a schematic diagram, illustrating a system 100 with a secondary content transcode pipeline (SCTP) platform 101 that may be used to automatically transcode renditions of source content and generate associations between the renditions and the source content for ease of access and management of the generated renditions. The SCTP platform 101 may include a secondary content (e.g., ad) transcode coordinator 102 (e.g., a service running on one or more electronic devices) that facilitates vendor agnostic transcoding downstream of a secondary content decisioning server 104, enabling more flexible rendition management and provision. FIG. 2 is a swim lane diagram 200, illustrating processes, employed by the components of system 100, for registering source content, generating transcoded renditions of the source content, and associating renditions with the source content, in accordance with certain embodiments. For simplicity, these figures will be discussed together.
Generating Secondary Content Transcoded Renditions for Insertion As mentioned above, the system 100 includes a transcode coordinator 102 and a secondary content decisioning server 104. The secondary content decisioning server 104 is tasked with maintaining a library of source secondary content (e.g., "creatives" and/or "advertisements"). The secondary content decisioning server 104 may also be tasked with maintaining orders for secondary content/ad placement, which may dictate how often, when and to whom particular ads are presented. In this manner, the secondary content decisioning server 104 is charged with secondary content selection decisioning, the process of deciding which ads/secondary content to present in a content streaming player, in conjunction with primary content that is presented in the content player 106.

As will be discussed in more detail below with respect to FIG. 7, traditional secondary content/ad decisioning has relied upon the secondary content decisioning server 104 to be aware of and provide an indication of particular renditions of selected secondary content to be presented in the content player 106. Unfortunately, however, this has created many inefficiencies, required the secondary content decisioning servers 104 to be aware of each transcoded rendition prior to selecting the rendition for inclusion in a secondary content decisioning server 104 response. The process of adding each rendition to the secondary content decisioning server 104 can be quite time consuming, as secondary content decisioning is typically performed by a third party service with limited availability to maintain a rendition library. Further, when changes are made to the source content, each rendition must be updated, exacerbating the availability issue of the secondary content decisioning server 104 team. To counteract these inefficiencies and others, the transcode coordinator 102 may trigger generation of each rendition of source secondary content and maintain a library of generated renditions, which may be associated with a unique identifier of the source secondary content. In this manner, the secondary content decisioning server 104 need not be aware of each rendition, but instead merely be aware of the source secondary content and the unique identifier, which may be returned in a secondary content decisioning server 104 response, when the secondary content decisioning server decides that a rendition of the source secondary content should be presented in conjunction with primary content being provided at the content player 106. In some embodiments, the provision includes the mezzanine version of the secondary content/source content itself.

To do this, secondary content decisioning server 104 may, in response to receiving a new secondary source content (e.g., "creative" and/or "ad"), provide the source content to the transcoding service (block 202). In some embodiments, the provision of the source content may be a Uniform Resource Identifier (URI)/Uniform Resource Locator (URL) where a mezzanine version of the source content is located.

The transcode coordinator 102 may receive the source content and, in response to receiving the source content, generate a source content identifier (SKID), such as a universally unique identifier (UUID), to represent the source content (block 204). The SCID may be provided back to the secondary content decisioning server 104, indicating that secondary content decisioning related to the provided source content may be requested using the SCID.

The transcode coordinator 102 may also request one or more media transcoder services 108 to transcode the source content into each of a set of desired renditions (block 206). To do this, the transcode coordinator 102 may identify a characteristic of the source content, such as a type of source content and/or which content streaming platforms the current source content may be served on. Based upon the characteristic, the type of transcoded renditions desired may be decided. For example, based upon the content streaming platforms that are possible providers of the source secondary content, a set of rendition types may be identified and requested to be generated by the media transcoder service 108 from the transcode coordinator 102. The transcode coordinator 102 may facilitate vender-agnostic transcoding. In other words, the transcode coordinator 102 may utilize any number of media transcoder services 108 to obtain the transcoded renditions. For example, application programming interfaces (APIs) of a first media transcoder service 108 may be used to request and receive transcoded renditions of a first type (e.g., a high definition (HD) rendition)

while a APIs of a second media transcoder service 108 may be used to request and receive transcoded renditions of a second type (e.g., a standard definition (SD) rendition). A number of factors may be used by the transcode coordinator 102 in selecting a particular media transcoder service 108 for transcoding particular renditions, including, but not limited to, transcoding costs, transcoding efficiency, transcoded rendition quality, a type of the source content, etc.

The media transcoder service 108 may receive the transcoding request from the transcoding coordinator 102 (block 208) and perform transcoding on the source content to generate and store the requested renditions (block 210). The transcoding may involve decoding and re-formatting the mezzanine version of the source content to match the requested transcoded rendition type. Examples of different transcoded revision types include versions with different resolutions (e.g., a standard definition rendition, a high definition rendition), varied frames per second (fps) (e.g., a 30 fps rendition, a 60 fps rendition), different encoding formats (e.g., an HTTP live streaming (HLS) rendition, a dynamic adaptive streaming over HTTP (Dash) rendition), different run lengths (e.g., a 6 second rendition, a 2 second rendition), different dynamic ranges (e.g., a high dynamic range (HDR) rendition, a standard dynamic range (SDR) rendition, or any combination thereof. The re-formatted version of the source content may be re-encoded, such that a newly formed transcoded rendition is generated. Through the re-encoding, the new rendition may be generated into segments with a manifest that specifies locations and orders of segments of the transcoded renditions. The manifests and segments of each transcoded rendition may be stored in storage 110 (e.g., cloud storage). In the illustrated embodiment of FIG. 1, the storage 110 includes regional storage instances (e.g., West Coast Instance 110A and East Coast Instance 110B). To facilitate efficient processing, the media transcoder service 108 may place the manifests and segments in one regional instance and the data from that regional instance may be mirrored/duplicated to other regional instances (e.g., as an external process, such as a process implemented by a hosting service of the storage 110).

After storing the segments and corresponding manifests for the transcoded renditions, the media transcoder service 108 may provide the manifests for the transcoded revisions back to the transcode coordinator 102 (block 212). The transcode coordinator 102 may receive each of the manifests for the different transcoded revisions (block 214).

Each transcoded rendition may be associated with the same generated SCID of the source content (block 216). For example, a relational database 112 may store an association that indicates that the SCID generated for a particular source content/creative is associated with each rendition transcoded from that source content.

Once the SCIDs and the transcoded renditions are associated, the SCID and manifests for each transcoded rendition may be provided to server-side insertion playback system 114 (depicted as server-side insertion components in FIG. 1) for secondary content (e.g., ad) insertion during content playback. In FIG. 1 the manifests for each transcoded rendition is provided to a server-side insertion (SSI) system 116 and/or the SSI system 116 is notified that the SCID and associated manifests for different transcoded renditions are available at the database 112 (block 218). As may be appreciated, the manifests may provide resource locators where segments of a transcoded rendition may be obtained.

Once the SSI system 116 is notified of the available renditions, the insertion service is able to identify, select, and insert specific transcoded renditions of a source content, when requested by the secondary content decisioning server 104. While FIG. 1 is illustrated as a server-side insertion system 116, a client-side insertion system may also utilize the system 100 to insert ads, as will be discussed in more detail below.

Selecting and Inserting Secondary Content Transcoded Renditions

Figure 3:
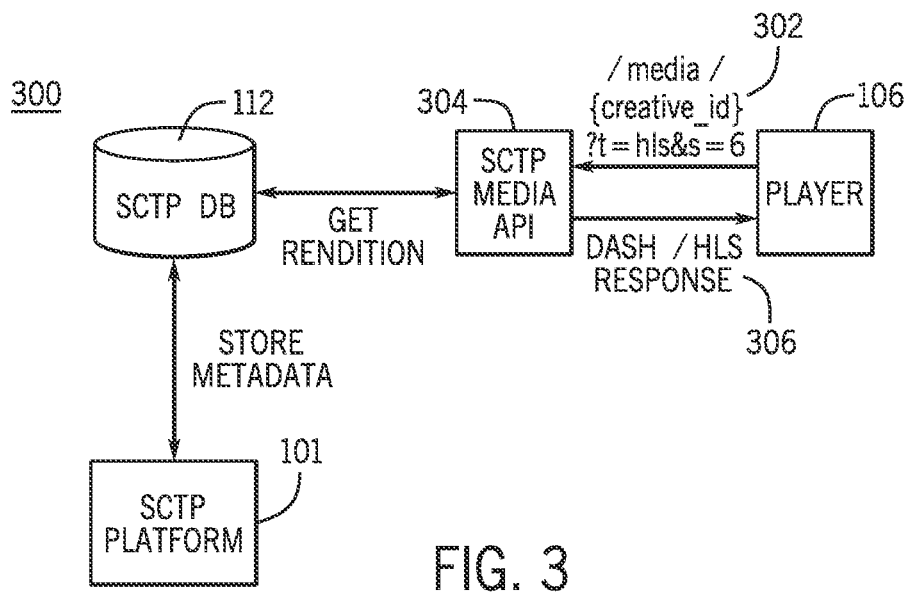
FIG. 3 is a schematic diagram, illustrating a system that provides client-side secondary content insertion, in accordance with certain embodiments.
Figure 4:
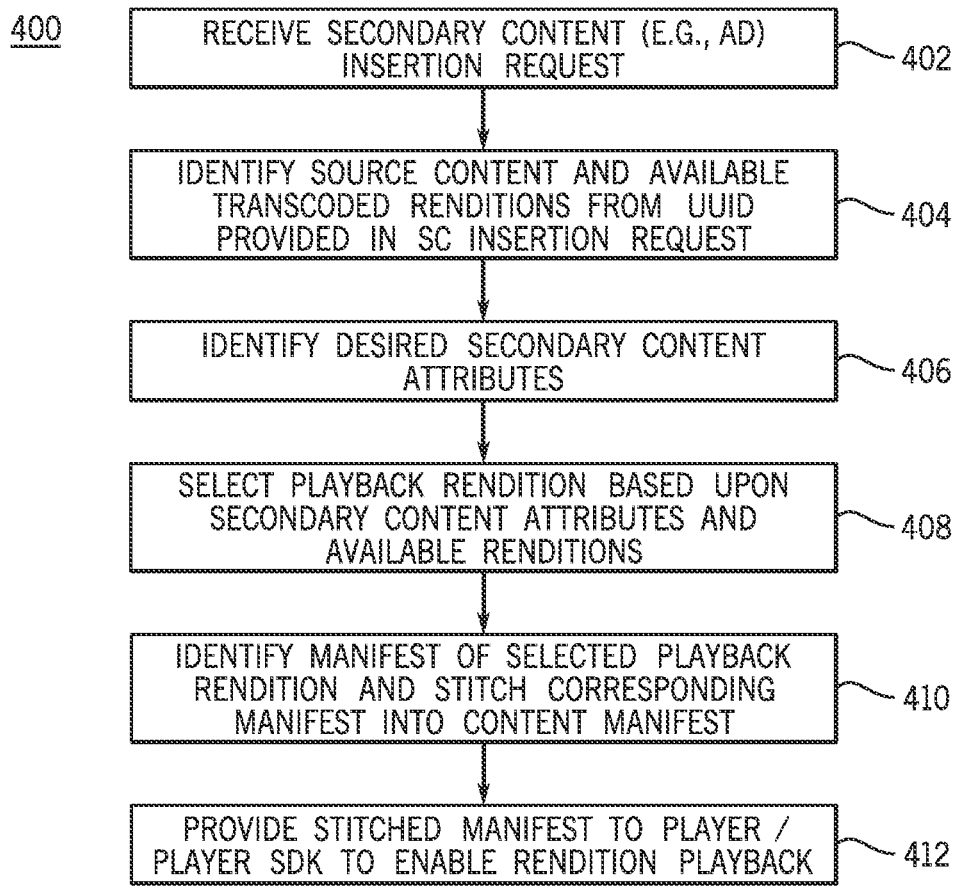
FIG. 4 is a flowchart, illustrating a process for providing server-side insertion, via renditions managed by the transcode pipeline, in accordance with certain embodiments.

Having discussed generation of the transcoded renditions and making them available for insertion, the discussion now turns to selecting and/or inserting the secondary content into primary content playback streams. As mentioned above, FIG. 1 illustrates a server-side insertion system. FIG. 3 illustrates a client-side insertion system 300. FIG. 4 illustrates a process 400 for secondary content (e.g., advertisement) insertion, via renditions managed by the transcode pipeline, depicted in FIG. 4. For simplicity, these figures will be discussed together.

Secondary content insertion may be implemented during playback of primary content via a content player 106. The content player 106 may request primary content for playback, which results in a video asset management (VAM) service 118 providing a particular rendition of the primary content in accordance with a request from the content player 106. The manifest of the primary content may be used to identify particular secondary content (e.g., an advertisement or "ad") parameters useful for selecting a particular transcoded rendition of the secondary content to insert into the primary content. Thus, the manifest of the primary content may be provided to an SSI proxy 120, which may communicate with the SSI system 116 to coordinate secondary content insertion into a primary content playback session of the content player 106.

As illustrated in secondary content insertion process 400 of FIG. 4, a request for secondary content insertion may be received (block 402). For example, when server-side insertion (e.g. SSI) is desired, the SSI system 116 of FIG. 1 may receive a server-side request 122 from the secondary content decisioning server 104, such as in the form of a Digital Video Ad Serving Template (VAST) and/or Video Multiple Ad Playlist (VMAP). When client-side secondary content insertion is desired, the content player 106 may provide a client-side request 302 to an SCTP Media API 304, as illustrated in FIG. 3. The SSI system 116 and/or the SCTP Media API 304 may identify a particular rendition of secondary content to insert into presentation of a primary content stream.

To do this, the source content to insert is identified and the available transcoded renditions associated with the source content are identified (block 404). The request for secondary content insertion, whether client-side or server-side, may provide the SCTP Media API 304 or the SSI system 116 the generated SCID representing the source content. By supplying the SCID, the SSI system 116 and/or SCTP Media API 304 may identify the source content. Further, the SSI system 116 and/or SCTP Media API 304 are communicatively coupled to the database 112 that maintains an indication of the source content and its associated SCID along with an association to each available transcoded rendition of the source content. Accordingly, the SSI system 116 and/or SCTP Media API 304 may identify the source content and the available transcoded renditions based upon data within the database 112, which may either be pushed (e.g., periodically and/or upon a data change) to and/or pulled (e.g., periodically) by the SSI system 116 and/or SCTP Media API 304.

To select a particular transcoded rendition, the desired secondary content attributes are identified (block 406). In some embodiments, a manifest of the primary content may provide attributes of the primary content. It may be desirable to match the primary content attributes when selecting the secondary content for playback. Accordingly, attributes extracted from the primary content playback manifest may be used to identify a particular transcoded rendition to select. In some embodiments, a request may also include secondary content attributes. For example, as illustrated in FIG. 3, the client-side request 302 made to the SCTP Media API 304 may include rendition attributes. In FIG. 3, an encoding format (e.g., HLS in FIG. 3) and a run length (e.g., here 6 seconds) are provided in the client-side request 302.

The identified desired secondary content attributes may be used to select a particular transcoded rendition for insertion into the primary content stream (block 408). For example, when the secondary content attributes indicate that a 4 second, high definition, HLS encoded rendition should be provided, and such a transcoded rendition is indicated as available in the database 112, this rendition may be selected for insertion into the primary content stream. When no such transcoded rendition exists, other rendition selection criteria may be used to select an available rendition. For example, in one embodiment, one or more particular attributes may be prioritized over other attributes when selecting a rendition. In some embodiments, the prioritized attribute(s) may be presentation platform specific. For example, if a first platform has certain playback requirements (e.g., a playback resolution requirement of 4K playback only), attributes associated with those requirements may be prioritized over other non-required attributes. In this manner, when no transcoded renditions fully match the identified secondary content attributes, a transcoded rendition that partially meets the attributes and/or comes closest to meeting the attributes may be selected, prioritizing certain attributes, especially those attributes that are required by a content presentation platform.

Once a desired transcoded rendition is selected, the manifest of the selected transcoded rendition is identified and stitched into the primary content manifest (block 410). In some embodiments, to do this, content insertion markers in the manifest of the primary content (e.g., SCTE markers) may be identified. The transcoded rendition manifest may be inserted at these content insertion markers, causing the transcoded rendition manifest to be inserted into the primary content manifest.

The stitched manifest is provided back to the content player 106 (block 412). For example, in FIG. 3, a response 306 is provided back to the content player 106. Thus, as the portions of the stitched manifest are implemented by the content player 106, the segments of the transcoded rendition are accessed and played back.

Transcoded Rendition Management

Having discussed generation, registration, and insertion of secondary content transcoded renditions, the discussion now turns to management of the transcoded renditions. FIG. 5 is a schematic diagram, illustrating an example graphical user interface (GUI) 500 of the transcode pipeline, in accordance with certain embodiments. As may be appreciated, the information presented in the GUI 500 may be sourced, at least partially, from data in the database 112.

As mentioned above, transcoded renditions are generated from a source content/creative. The GUI 500 may provide a link 502 to the source content (e.g., the mezzanine version). When selected, the link 502 may launch a content player that plays back the source content.

The GUI 500 also provides a graphical indication of the SCID 504 generated by the SCTP platform 101, here indicated as a "Creative ID". As mentioned above, the SCID 504 may be provided to the secondary content decisioning service (e.g., the secondary content decisioning server 104 for server-side insertion and/or content player 106 for client-side insertion), enabling these components to request insertion of particular secondary content independent of knowledge of and/or requesting a particular rendition of the secondary content. An internal identifier 506 may also be provided that includes a prefix (e.g., here "63f818d98d64b25c8b548cb") indicating the grouping of the mezzanine version and transcoded versions (which may also be identified via the prefix). A unique suffix is used for each piece of content in the grouping, creating unique identifiers. Additional information 507 regarding the source content may also be provided in the GUI 500. For example, a registration status indicative of whether the secondary content has been registered in the database 112 is provided, a backfill status is provided, and a creation date is provided.

As will be described in more detail with respect to FIG. 7, instead of requesting a particular transcoded rendition, the secondary content insertion request may request/reference the SCID 504, enabling other components (e.g., the SSI system 116 and/or the SCTP Media API 304) to select a particular one of a set of transcoded renditions associated with the secondary content represented by the SCID 504. The GUI 500 may provide a list 508 of the transcoded renditions that have been generated for the source content represented by the SCID 504. The list 508 may include an id 510 associated with each transcoded rendition, a template 512 indicating the type of transcoded rendition generated, a submission time 514 when the transcoded rendition was registered with the SCTP platform 101, a version 516 of the transcoded revision, a transcoding status 518 of the transcoded rendition, registration data 520 of each transcoded rendition, and an affordance 522 to view additional details of each transcoded rendition. In some embodiments, each of the transcoded renditions in the list 508 is selectable, and may act as an additional and/or alternative affordance 522.

When the affordance 522 is selected, an expanded view particular to selected rendition may be rendered in the GUI 500. FIG. 6 is a schematic diagram, illustrating the GUI 500 with an expansion 602 of rendition details of a particular transcoded rendition 604, in accordance with certain embodiments. In the depicted embodiment of FIG. 6, the expansion 602 of GUI 500 includes encoding details 606 specific to the transcoded rendition.

Additionally, the expansion 602 provides resource locator links 608 to particular transcoded renditions. As illustrated, in some embodiments, multiple transcoded renditions (e.g., sub-renditions 610) may be aggregated under a particular item within the list 508. For example, in FIG. 6, two different transcoded renditions are provided, one with a DASH playback type and another with an HLS playback type, both under a 4 k, HDR, 4 second transcoded rendition selection in the list 508. This may provide ease of navigation by providing transcoded renditions with common attributes under a common selection in the list 508, despite having some different attributes.

The expansion 602 also includes a content player 612. The content player 612 may present playback of the associated managed rendition 604 and/or sub-rendition 610 (e.g., when playback option 614 is selected). For example, as mentioned above, the database 112 may include manifest resource locators to the various segments of each transcoded rendition. These resource locators may be used to populate the content player 612 with the transcoded rendition for playback.

As may be appreciated from the above discussion, the association of transcoded renditions to source content may be managed externally from a secondary content (e.g., ad) decisioning service (e.g., the secondary content decisioning server 104). This may greatly improve secondary content management, as dedicated systems may associate and select particular transcoded renditions for a particular playback sessions. This may drastically improve playback performance, by enabling complex varieties of transcoded renditions that may be selected by dedicated secondary content insertion services and enabling secondary content decisioning services to focus primarily on determining which source content should be provided in particular sessions. With this in mind, FIG. 7 is a schematic diagram illustrating a comparison 700 of a secondary content insertion request 702 when transcoded renditions are managed by a secondary content decisioning service (e.g., secondary content decisioning server 104) versus a secondary content insertion request 704 when transcoded renditions are managed by a secondary content insertion service (e.g., SSI system 116 and/or SCTP Media API 304). As illustrated, the request 702 includes resource locators 706 to each segment of a particular transcoded rendition of selected source content. To provide such a request 702, the secondary content decisioning service (e.g., secondary content decisioning server 104) would need to manage manifests providing the resource locators for each transcoded rendition that may be selected for a playback session.

In contrast, in the request 704, the SCID 504 may be supplied independent of information of a particular transcoded rendition. In this manner, not only is the request 704 simpler to form and easier to parse, but the secondary content decisioning service can provide a request without having to know about and/or manage particular renditions of source content. Instead, the secondary content insertion service (e.g., SSI system 116 and/or SCTP Media API 304) may select a particular transcoded rendition and insert a corresponding manifest into a primary content manifest at a component that is relatively closer to the primary content session based upon attributes more easily attainable by the secondary content insertion service. Thus, secondary content insertion management and/or processing may be greatly improved.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a transcoded rendition datastore; and
a transcode coordinator service, configured to:
  receive an indication of a source content;
  generate a source content unique identifier (SCID) representative of the source content;
  provide a request, to a media transcoder service, to transcode the source content;
  in response to providing the request to transcode the source content, receive a manifest of a transcoded rendition of the source content;
  create an association between the manifest and the SCID; and
  store the association in the transcoded rendition datastore.

2. The system of claim 1, wherein the transcode coordinator service is configured to:
identify a characteristic of the source content; and
select a media transcoder service from a plurality of media transcoder services, based upon the characteristic of the source content.

3. The system of claim 1, wherein the transcode coordinator service is configured to:
provide the SCID to a secondary content decisioning service that is tasked with selecting secondary content to insert into a primary content playback session, enabling the secondary content decisioning service to select and indicate the SCID as the source content associated with the secondary content to insert into the primary content playback session.

4. The system of claim 1, wherein the request comprises a Video Ad Serving Template (VAST) that references the SCID independent of providing an indication of a specific transcoded rendition to insert.

5. The system of claim 1, wherein the request comprises a Video Multiple Ad Playlist (VMAP) that references the SCID independent of providing an indication of a specific transcoded rendition to insert.

6. The system of claim 1, comprising:
a secondary content insertion system, configured to:
  receive a request to insert secondary content into a primary content playback session, the request providing the SCID; and
  in response to receiving the request to insert the secondary content into the primary content playback session:
  identify one or more transcoded rendition selection attributes;
  identify a set of transcoded renditions associated with the SCID that are available in the transcoded rendition datastore;
  select a transcoded rendition to insert from the set of transcoded renditions;
  obtain a manifest of the selected transcoded rendition to insert; and
  stitch the manifest of the selected transcoded rendition to insert into a manifest of the primary content playback session.

7. The system of claim 6, wherein the secondary content insertion system, is configured to:
identify the one or more transcoded rendition selection attributes by matching one or more attributes of the manifest of the primary content playback session.

8. The system of claim 6, wherein the secondary content insertion system, is configured to:

identify a prioritization of the one or more transcoded rendition selection attributes; and select the transcoded rendition to insert based upon the prioritization of the one or more transcoded rendition selection attributes.

9. The system of claim 8, wherein the prioritization of the one or more transcoded rendition selection attributes is based upon a content presentation platform of the primary content playback session.

10. The system of claim 6, wherein the one or more transcoded rendition selection attributes comprise:
a secondary content playback resolution;
a secondary content playback framerate;
a secondary content playback encoding format;
a secondary content playback run length;
a secondary content playback dynamic range; or
any combination thereof.

11. The system of claim 6, wherein the secondary content insertion system comprises a server-side secondary content insertion system that is configured to receive the request to insert the secondary content into the primary content playback session from a secondary content decisioning server.

12. The system of claim 6, wherein the secondary content insertion system comprises a client-side secondary content insertion system that is configured to receive the request to insert the secondary content into the primary content playback session from a content player of the primary content playback session.

13. The system of claim 12, wherein the request to insert the secondary content into the primary content playback session comprises the one or more transcoded rendition selection attributes.

14. The system of claim 6, wherein the transcode coordinator service is configured to provide an indication of each of the set of transcoded renditions associated with the SCID that are available in the transcoded rendition datastore to the secondary content insertion system, enabling the secondary content insertion system to:
select the transcoded rendition to insert from the set of transcoded renditions and obtain; and
obtain the manifest of the selected transcoded rendition to insert into the manifest of the primary content playback session.

15. The system of claim 1, comprising:
at least one processor configured to provide a graphical user interface (GUI), the GUI comprising:
an indication of the SCID; and
a list of available transcoded renditions associated with the SCID, as indicated by data of the transcoded rendition datastore;
wherein the GUI is configured to, upon selection of an affordance associated one of the available transcoded renditions, expand a section of the GUI associated with the one of the available transcoded renditions, to provide an indication of details of the one of the available transcoded renditions.

16. A tangible, non-transitory, computer-readable medium, comprising computer-readable instructions that, when executed by one or more processors of one or more computers, cause the one or more computers to:
receive an indication of a source content;
generate a source content unique identifier (SCID) representative of the source content;
provide a request, to a media transcoder service, to transcode the source content;
in response to providing the request to transcode the source content, receive a manifest of a transcoded rendition of the source content;
create an association between the manifest and the SCID; and
store the association in a transcoded rendition datastore.

17. The tangible, non-transitory, computer-readable medium of claim 16, comprising computer-readable instructions that, when executed by the one or more processors of the one or more computers, cause the one or more computers to:
identify a second transcoded rendition to generate from the source content;
provide a second request, to the media transcoder service or another media transcoder service, to transcode the source content into the second transcoded rendition;
in response to providing the second request, receive a second manifest of the second transcoded rendition;
create an association between the second manifest and the SCID; and
store the association between the second manifest and the SCID in the transcoded rendition datastore.

18. A computer-implemented method, comprising:
receiving a request to insert secondary content into a primary content playback session, wherein the request comprises a unique identifier of the secondary content without an indication of a particular transcoded rendition of the secondary content to insert; and
in response to receiving the request to insert the secondary content into the primary content playback session:
identifying one or more transcoded rendition selection attributes;
identifying a set of transcoded renditions associated with the unique identifier that are available in a transcoded rendition datastore;
selecting a transcoded rendition to insert from the set of transcoded renditions;
obtaining a manifest of the selected transcoded rendition to insert; and
stitching the manifest of the selected transcoded rendition to insert into a manifest of the primary content playback session.

19. The computer-implemented method of claim 18, wherein the request is received from a server-side secondary content decisioning service.

20. The computer-implemented method of claim 18, wherein the request is received from a client-side content player of the primary content playback session.

* * * * *